Patented Jan. 9, 1934

1,942,886

UNITED STATES PATENT OFFICE 1,942,886

METHOD OF PRODUCING NITRATES AND RECOVERY OF NITRIC OXIDE

Bruno Uebler, Berlin, Germany

No Drawing. Application June 17, 1929, Serial No. 371,707, and in Germany September 17, 1927

2 Claims. (Cl. 23—161)

My invention refers to the production of nitrates and has for its particular object to produce nitrates from chlorides and nitric acid or nitrous gases without losing any nitrogen.

In the production of nitrates on a large scale the starting material must be readily available and therefore nitrous gases or nitric acid on the one hand and metal chlorides, more especially potassium chloride, on the other hand are used for this purpose. All the processes hitherto devised, however, do not pay sufficient attention to the losses of nitrogen arising in the reactions. In order to exclude any such losses, the reaction $$KCl + HNO_3 = KNO_3 + HCl \quad (I)$$

must take place quantitatively in such manner that all the chlorine escapes in the form of hydrochloric acid or that according to the reaction $$HNO_3 + 3HCl = 2H_2O + NO + 3Cl \quad (II)$$

all the chlorine escapes as such, without any nitric oxide being lost.

In reality, however, the reaction II as a rule occurs differently, viz, $$HNO_3 + 3HCl = 2H_2O + NOCl + 2Cl \quad (IIa),$$

nitrosyl chloride being formed. The difficulty of separating Cl from NO rendered all prior processes uncommercial.

In my copending application for Letters Patent of the United States, Serial No. 487,023 now Patent No. 1,899,123, I have described a method by which this separation can be effected in the following manner: If the gas mixture is cooled down to a low temperature, NOCl is liquefied and can be separated as a liquid from the chlorine. I may, however, also heat the gas mixture first to a higher temperature and thereafter cool it down quickly to a low temperature under supply of air. I then obtain a mixture of $NO_2$ and Cl, which can be separated by liquefaction in the cold and fractional distillation, the chlorine escaping first.

According to the present invention I also convert metal chlorides to metal nitrates by heating the chlorides with nitric acid or nitrous gases, but I make use of another mode of separating nitrosyl chloride and chlorine which is based on the addition of NOCl to $FeCl_3$, whereby the compound $FeCl_3 \cdot NOCl$ is formed, while the chlorine escapes as such. On heating the compound, nitrosyl chloride is split off again in a substantially pure form and without any material losses.

In order now to decompose the nitrosyl chloride, freed from chlorine in one or the other manner, so that nitric oxide and chlorine are recovered separately, I may proceed in such manner that chlorine is combined, while nitric oxide escapes.

I obtain this by conducting nitrosyl chloride at ordinary temperature over scrap iron. According to the equation $$Fe + 4NOCl = FeCl_3 \cdot NOCl + 3NO$$

there is formed besides nitric oxide, which is re-used in conversion of metal chlorides into metal nitrates an addition compound of NOCl and ferric chloride. This compound is then decomposed by heating, and ¼ of the nitrosyl chloride originally used are thereby split off.

I may, however, also proceed in such manner that I conduct the raw nitrosyl chloride also containing free chlorine at an elevated temperature over metallic iron, the chlorine whether elementary or linked in nitrosyl chloride is then combined with iron, while the nitric oxide escapes as such. I may, however, also decompose the nitrosyl chloride after it has been purified in some suitable manner, by passing it at an elevated temperature over iron, so that merely chlorine is retained while the nitric oxide in more or less pure form is returned, directly or indirectly, into the liquor from which the original mixture of Cl and NOCl was obtained.

If according to one of the modifications above described the main quantity of chlorine is removed from the gas mixture and if the nitric oxide resulting in the decomposition of the nitrosyl chloride is returned into the reaction liquor resulting in the interaction between nitric acid and the chlorides, the chlorine can be removed without any losses of nitrogen and nitrates can now be produced by acting with nitric acid on chlorides without any nitrogen being lost.

Example

The gas mixture obtained in acting with nitric acid on potassium chloride contained 9% nitrosyl chloride, 13.5% chlorine and 77.5% nitrogen. 10 cbms of this gas mixture were conducted at 20° C. over 4 kilograms scrap iron. There resulted 10.9 kilograms of a mixture containing 17% metallic iron and 83% $FeCl_3NOCl$, the inert residual gases escaping free from nitrogen oxides.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. In the process of producing nitrates from chlorides and nitric acid or nitrous gases, the step of regenerating nitric oxide from the nitrosyl chloride evolved together with chlorine comprising passing this mixture over ferric chloride to form an addition compound of ferric chloride and nitrosyl chloride, heating said addition compound to recover the nitrosyl chloride in a substantially pure form, passing said pure nitrosyl chloride at ordinary temperature over iron to form nitric oxide and an addition compound of ferric chloride and nitrosyl chloride, the nitric oxide being re-used in cycle.

2. In the process of producing nitrates from chlorides and nitric acid or nitrous gases the step of regenerating nitric oxide from the nitrosyl chloride evolved together with chlorine comprising passing this mixture over ferric chloride to form an addition compound of ferric chloride and nitrosyl chloride, heating said addition compound to recover the nitrosyl chloride in a substantially pure form, passing said nitrosyl chloride over metallic iron at an elevated temperature to eliminate substantially all the chlorine in the form of ferric chloride, the nitric oxide remaining over being re-used in cycle.

BRUNO UEBLER.